US009294963B2

(12) United States Patent
Masini et al.

(10) Patent No.: US 9,294,963 B2
(45) Date of Patent: Mar. 22, 2016

(54) NEIGHBOR SELECTION FOR HANDOVER IN A RADIO ACCESS NETWORK

(71) Applicant: Telefonaktiebolaget L M Ericsson (publ), Stockholm (SE)

(72) Inventors: Gino Luca Masini, Stockholm (SE); Angelo Centonza, Winchester (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/348,116

(22) PCT Filed: Sep. 26, 2012

(86) PCT No.: PCT/EP2012/068950
§ 371 (c)(1),
(2) Date: Mar. 28, 2014

(87) PCT Pub. No.: WO2013/045486
PCT Pub. Date: Apr. 4, 2013

(65) Prior Publication Data
US 2014/0228031 A1  Aug. 14, 2014

(30) Foreign Application Priority Data
Sep. 30, 2011  (EP) .................................... 11183620

(51) Int. Cl.
*H04W 36/00* (2009.01)
*H04W 84/04* (2009.01)
*H04W 92/20* (2009.01)

(52) U.S. Cl.
CPC ...... *H04W 36/0005* (2013.01); *H04W 36/0083* (2013.01); *H04W 84/045* (2013.01); *H04W 92/20* (2013.01)

(58) Field of Classification Search
CPC .................... H04W 36/0005; H04W 36/0083; H04W 84/045; H04W 92/20; H04W 36/08; H04W 48/08; H04W 48/10
USPC ........................................................ 455/436
See application file for complete search history.

(56) References Cited

U.S. PATENT DOCUMENTS

| | | | | |
|---|---|---|---|---|
| 2010/0279687 | A1* | 11/2010 | Horn et al. | 455/435.1 |
| 2011/0070897 | A1* | 3/2011 | Tang et al. | 455/456.1 |
| 2011/0142004 | A1 | 6/2011 | Bae et al. | |
| 2011/0287756 | A1* | 11/2011 | Cho | H04W 52/0229 455/418 |
| 2013/0005340 | A1* | 1/2013 | Drazynski et al. | 455/436 |
| 2013/0070663 | A1* | 3/2013 | Gunnarsson | H04W 36/0083 370/315 |

OTHER PUBLICATIONS

ETSI TS 136 300 V10.4.0 (Jun. 2011): "ETSI TS 136 300 V10.4.0 (Jun. 2011); LTE; Evolved Universal Terrestrial Radio Access (E-UTRA) and Evolved Universal Terrestrial Radio Access Network (E-UTRAN); Overall description; Stage 2 (3GPP TS 36.300 version 10.4.0 Release 10)", Technical Specification, European Telecommunications Standards Institute (ETSI), 650, Route Des Lucioles; F-06921 Sophia-Antipolis, France, vol. 3GPP RAN 2, No. V10.4.0, Jun. 1, 2011, 208 pages, XP014066386.
Catt: "3GPP TSG RAN WG2 Meeting #67; R2-094311; Reporting of Access Mode", 3GPP TSG RAN WG2 Meeting #67, R2-094311, Shenzhen, China, Aug. 24, 2009, 2 pages, XP008156208.
Samsung, "3GPP TSG RAN WG3 Meeting #63bis; R3-090857, Discussion on HeNB NRT Management in Macro eNB", 3GPP Draft, R3-090857 Discussion on HeNB NRT Management in Macro eNB, 3rd Generation Partnership Project 93GPP), Mobile Competence Centre; 650, Route Des Lucioles, F-06921 Sophia-Antipolis Cedex, France, vol. RAN WG3, No. Seoul, Korea, Mar. 18, 2009, 2 pages, XP050609801.
Samsung, "3GPP TSG RAN WG3 Meeting #69; R3-102142, Clarification to ANR Operation", 3GPP Draft, R3-102142__Clarification-to-ANR-Operation, 3rd Generation Partnership Project (3GPP), Mobile Competence Centre; 650, Route Des Lucioles, F-06921 Sophia-Antipolis Cedex, France, vol. RAN WG3, No. Madrid, Spain, 20100823, Aug. 15, 2010, 4 pages, XP050453020.
Ericsson, "3GPP TSG RAN WG3 Meeting #73bis; R3-112595, X2 Mobility between Maco and Open HeNBs", 3GPP Draft, R3-112595, 3rd Generation Partnership Project (3GPP), Mobile Competence Centre, 650, Route Des Lucioles, F-06921 Sophia-Antipolis Cedex, France, vol. RAN WG3, No. Zhuhai, China, 20111010, Oct. 1, 2011, 2 pages, XP050542300.
Ericsson, "3GPP TSG RAN WG3 Meeting #73bis; R3-112594, CSG-Aware X2 Handovers", 3GPP Draft, R3-112594, 3rd Generation Partnership Project (3GPP), Mobile Competence Centre, 650, Route Des Lucioles, F-06921 Sophia-Antipolis Cedex, France, vol. RAN WG3, No. Zhuhai, China, 20111010, Oct. 1, 2011, 3 pages, XP050542299.
Alcatel-Lucent, "Further enhancements for HNB and HeNB", TSG RAN Meeting #51, Kansas City, USA, Mar. 15-18, 2011, RP-110456, Agenda Item 14.2, 6 pages.

| Neighbor Relation | TCI | CSG ID | Cell Access Mode | No Remove | No HO | No X2 |
|---|---|---|---|---|---|---|
| 1 | TCI #1 | CSG ID #1 | Closed | | | |
| 2 | TCI #2 | | | | | ✓ |
| 3 | TCI #3 | | | ✓ | | |
| 4 | TCI #4 | CSG ID #2 | Hybrid | | | |
| 5 | TCI #5 | | Open | ✓ | | |
| ... | | | | | | |

3GPP, "3rd Generation Partnership Project; Technical Specification Group RAN; UMTS and LTE; Mobility Enhancements for H(e)Nb (Release 11)", 3GPP TR 37.803 V0.1.2 (Jun. 2011), 15 pages.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.4.0 (Jun. 2011), 193 pages.

3GPP, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.3.0 (Sep. 2011), 296 pages.

3GPP, "3rd Generation Partnership Project; Technical Specification Group Radio Access Network; Evolved Universal Terrestrial Radio Access Network (E-UTRAN); X2 application protocol (X2AP) (Release 10)", 3GPP TS 36.423 V10.2.0 (Jun. 2011), 130 pages.

Catt: "TSG-RAN WG2, Meeting #69; R2-101047, ANR Function with Inbound Handover"; 3GPP Draft; R2-101047, 3rd Generation Partnership Project (3GPP), Mobile Competence Centre; 650, Route Des Lucioles; F-06921 Sophia-Antipolis Cedex; France, vol. RAN WG 2, No. San Francisco, USA; Feb. 12, 2010, 2 pages, XP050421362.

European Search Report issued on Jul. 9, 2012 in corresponding European application No. 11183620.1, 17 pages.

* cited by examiner

*Primary Examiner* — Barry Taylor

(74) *Attorney, Agent, or Firm* — Rothwell, Figg, Ernst & Manbeck, P.C.

(57) ABSTRACT

The following methods are disclosed: A method of initiating handover of a User Equipment, UE, in a cellular network comprising a plurality of enhanced Node Bs, eNBs, the method comprising: receiving at a source eNB, from the UE, a handover measurement report containing a Physical Cell Identifier, PCI, of a cell of a neighboring eNB; at the source eNB, performing a lookup of a Neighbor Relation Relation Table to identify a global cell identity and access mode associated with the PCI; and using the identified global cell identity and the access mode to determine an eNB identity for said neighboring eNB. A method of initiating handover of a User Equipment, UE, in a cellular net-work comprising a plurality of enhanced Node Bs, eNBs, the method comprising: receiving at a source eNB, from the UE, a handover measurement report containing a Physical Cell Identifier, PCI, of a cell of a neighboring eNB; at the source eNB, performing a lookup of a Neighbor Relation Table to identify a plurality of global cell identities associated with the PCI, the neighbor relation table also containing, for each such global cell identity, PCIs of neighboring cells; selecting the correct global cell identity from said plurality of global cell identities by comparing the PCIs of further neighboring eNBs cells reported by the UE with the neighboring PCIs of each of said plurality of global cell identities; and deriving from the selected correct global cell identity, an eNB identity of said neighboring eNB. A method of initiating handover of a subscriber from a cell of a source enhanced Node B, eNB, to a cell of a target enhanced Node B, eNB, via the X2 interface, the method comprising, at the source eNB, maintaining a Neighbor Relation Table (NRT) identifying the connectivity of the source eNB to cells of its neighboring eNBs, this information including for each eNB cell an indication that the eNB cell is an open, closed or hybrid eNB cell and, for each closed and hybrid eNB cell, a Closed Subscriber Group, CSG, identity; determining that a handover of the UE is required and using the information stored in the NRT to identify closed and optionally hybrid eNBs cells to which the subscriber has access, selecting a target eNB cell from the available open eNBs cells and the identified closed and optionally hybrid eNBs cells, and performing handover of the subscriber from the source to the target eNB cell including an X2 interface between the source and the target eNBs where no such interface exists a priori.

11 Claims, 5 Drawing Sheets

| Neighbor Relation | TCI | CSG ID | Cell Access Mode | No Remove | No HO | No X2 |
|---|---|---|---|---|---|---|
| 1 | TCI #1 | CSG ID #1 | Closed | | | |
| 2 | TCI #2 | | | | | ✓ |
| 3 | TCI #3 | | | ✓ | | |
| 4 | TCI #4 | CSG ID #2 | Hybrid | | | |
| 5 | TCI #5 | | Open | ✓ | | |
| ... | | | | | | |

Figure 2

NEIGHBOR SELECTION FOR HANDOVER IN A RADIO ACCESS NETWORK

CROSS-REFERENCE TO RELATED APPLICATIONS

This application is a 35 U.S.C. 0371 National Phase Entry Application from PCT/EP2012/068950, filed Sep. 26, 2012, and designating the United States, which claims priority to European Application No. 11183620.1, filed Sep. 30, 2011. The above-mentioned applications are incorporated by reference herein.

TECHNICAL FIELD

The present invention relates to neighbor selection for handovers in a Radio Access Network. More particularly, though not necessarily, the invention relates to eNB target cell selection in the case of X2 interface handovers in the E-UTRAN.

BACKGROUND

Specification is ongoing in 3GPP for the Evolved Universal Terrestrial Radio Access Network (E-UTRAN) that is the next generation of Radio Access Network (RAN). Another name for E-UTRAN, used in the present specification, is Long Term Evolution (LTE) RAN. The core network to which E-UTRAN is connected is called the Evolved Packet Core (EPC), also known as System Architecture Evolution (SAE) network. Both the E-UTRAN and the EPC (and possibly some other node(s), such as the Home Subscriber Server (HSS), depending on the definition of the EPC) comprise together the Evolved Packet System (EPS), which is also known as the SAE/LTE network. A base station in this concept is called an Evolved NodeB (eNodeB or eNB).

As originally envisaged, an eNB would be available to all subscribers of the Public Land Mobile Network (PLMN) of which the eNB is a part, and to subscribers of other network having appropriate roaming agreements with this PLMN. However, ongoing studies also include the possibility to have an E-UTRAN base station which provides home or small area coverage for a limited number of users. This base station is, in 3GPP and in this document, called a Home Evolved NodeB (HeNB) or home base station. Other names used for this type of base station are LTE Home Access Point (LTE HAP) or LTE Femto Access Point (LTE FAP). In 3G Universal Mobile Telecommunication System (UMTS) the equivalent base station to an HeNB is referred to as a Home Node B (HNB). While HeNBs are used herein, similar concepts apply to the HNB of the 3G UMTS systems.

An HeNB typically provides regular services for the end users and can be connected to the mobile core network using an IP-based transmission link. The radio service coverage provided by an HeNB is called a femtocell in this application. Furthermore, a femtocell is normally a Closed Subscriber Group (CSG) cell, i.e., a cell in which only a limited but variable set of users is normally allowed to access the network. The HeNB would, in most cases, use the end user's already existing broadband connection (e.g. xDSL and Cable) to achieve connectivity to the operator's Public Land Mobile Network (PLMN) and possibly to other eNBs/HeNBs, via some gateway, e.g. a HeNB gateway. A reason for providing wireless local access using HeNBs and femtocells is to provide cheaper calls or transaction rates/charges when a device (e.g., a mobile phone) is connected via an HeNB as compared to when that device is connected via an eNB. The proposed architecture also allows for increased traffic levels and user density.

Certain HeNBs may allow access to all subscribers having access to the PLMN, whilst prioritising subscribers belonging to the associated CSG. Such HeNBs are sometimes referred to as "hybrid" HeNBs. Other HeNBs may provide open and non-prioritised access to all subscribers and these are referred to as "open" HeNBs.

More generally, an HeNB and similar devices can be considered to be a sort of "home base station". As used herein, the term "home" is used to modify the phrase "base station" to distinguish such equipment from other conventional base stations based upon characteristics such as one or more of: (1) geographic radio coverage provided (i.e., home base station coverage area is normally less than "regular" base station coverage area), (2) subscriber access (i.e., the subscribers who can obtain service from the home base station may be limited whereas a "regular" base station will typically provide access to any subscribers (or at least to a larger group of subscribers than a home base station) who are within range), and (3) home base stations are normally installed by the end users themselves without any intervention from the operator's personnel, whereas regular base stations are typically installed by operator personnel. This latter quality of home base stations suggests that the installation will generally be highly automated and of a "plug and play" nature. Note, however, that home base stations need not literally be installed in personal residences, and may find applications in businesses, public areas, etc., wherein the qualities of a home base station are desirable to, e.g., supplement coverage provided by regular base stations. Home gateways, as the phrase is used herein, are gateways which interface home base stations with a node in the radio communication system, e.g., a core network node.

For a given Public Land Mobile Network (PLMN) (to which both the HeNB and the CSG members are assumed to belong), the CSG data is managed by the Operation Maintenance Administration and Provisioning (OMA&P) system (sometimes also known as OAM&P system) of the PLMN to which the HeNB connects. The OMA&P system deals with, for example, configuration, supervision and tuning of the radiocommunication network, administration of subscriber related data and provisioning of data, features and services. The CSG "whitelist" of a subscriber, which includes identities of the CSGs the subscriber is a member of and thus is allowed to access, is managed by the OMA&P system and the HSS of the subscriber's home PLMN and the subscriber's UE (e.g., its USIM).

Up to and including 3GPP E-UTRAN Release-9, handover of a UE between eNBs (including eNBs per se and HeNBs) was conducted over the S1 vertical interface between the eNBs and the Mobility Management Entity (MME). Release-10 [E-UTRA and E-UTRAN Overall Description; Stage 2 (Release 10); 3GPP TS 36.300 Rel-10 V10.4.0 (2011-06)] introduced the possibility of conducting the handover over the X2, peer-to-peer, interface between eNBs, but only for those cases where access control at the core network is not needed, i.e. when source and target belong to the same CSG or when the target is an open HeNB.

3GPP RAN3 has recently started work on a Release-11 Study Item [Alcatel-Lucent, Proposed SID: Further enhancements for HNB and HeNB; 3GPP RAN RP-110456] and which is concerned with enhanced mobility between eNBs and HeNBs, aiming among other things to enable X2-based handover also in cases where access control is required (e.g. between HeNBs belonging to different CSGs or when eNBs are involved). In particular, enhanced mobility scenarios between macro and hybrid/open HeNBs (see FIG. 1) have been recently prioritized by RAN3 in the scope of this SI [Sec. 5.2.1 of Mobility Enhancements for H(e)NB (Release 11); 3GPP TR 37.803 V0.1.2 (2011-06)]

It is now required to address the issue of how to aid the source eNB in the selection of the most appropriate X2 handover candidate for a CSG UE, while minimizing the need for core network involvement for access control and minimizing the risk of handing over to a wrong or inappropriate cell (which may result in a handover failure).

SUMMARY

According to a first aspect of the present invention there is provided a method of initiating handover of a subscriber from a cell of a source enhanced Node B, eNB, to a cell of a target enhanced Node B, eNB, via the X2 interface. The method comprises, at the source eNB, maintaining a Neighbor Relation Table (NRT) identifying the connectivity of the source eNB to cells of its neighboring eNBs, this information including for each eNB cell an indication that the eNB cell is an open, closed or hybrid eNB cell and, for each closed and hybrid eNB cell, a Closed Subscriber Group, CSG, identity. The method further comprises determining that a handover of the UE is required and using the information stored in the NRT to identify closed and optionally hybrid eNBs cells to which the subscriber has access, selecting a target eNB cell from the available open eNBs cells and the identified closed and optionally hybrid eNBs cells, and performing handover of the subscriber from the source to the target eNB cell including establishing an X2 interface between the source and the target eNBs where no such interface exists a priori.

Further aspects of the invention are defined in the accompanying claims.

BRIEF DESCRIPTION OF THE DRAWINGS

FIG. 2 is a table illustrating an extended Neighbor relation table maintained within an eNB of the E-UTRAN of FIG. 1;

DETAILED DESCRIPTION

Figure 1:
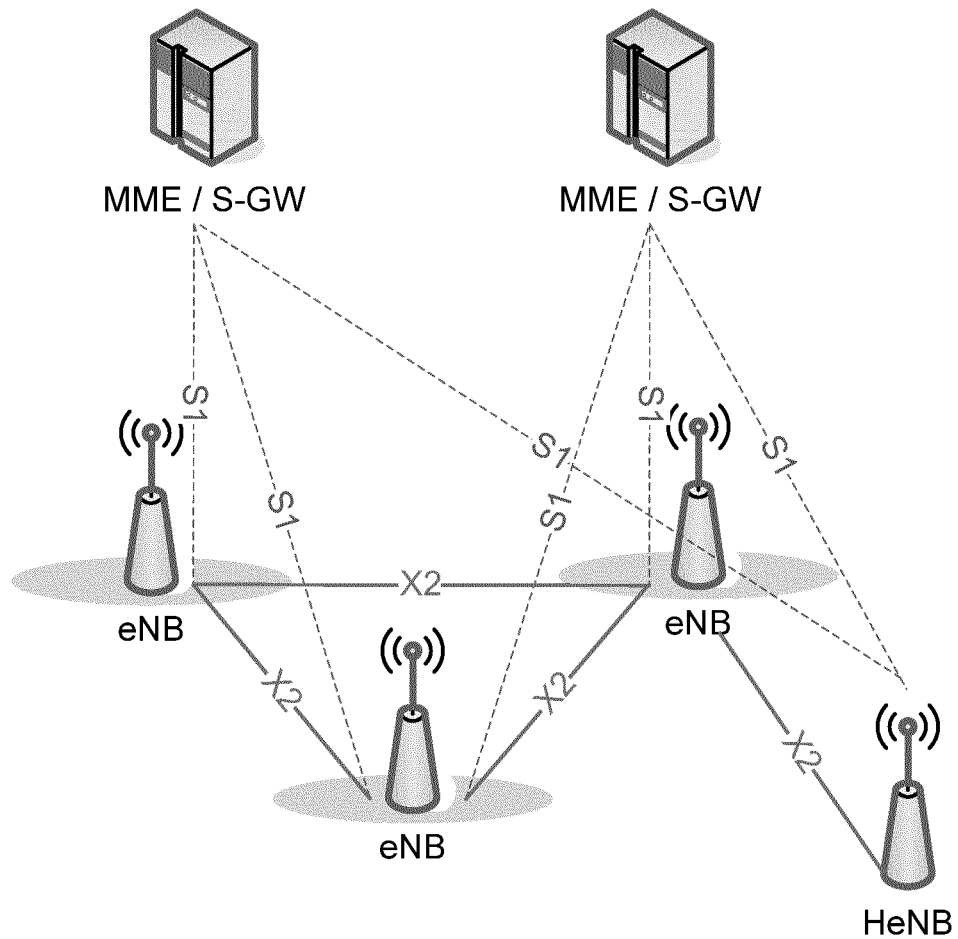
FIG. 1 illustrates schematically components of an E-UTRAN.

According to current 3GPP Long Term Evolution (LTE) specifications, the eNB can obtain knowledge about its connectivity to its neighbors by means of a Neighbor Relation Table (NRT) which it maintains. The NRT in the eNB can be configured either manually or via Operation and Maintenance (O&M) processes, or automatically via the Automatic Neighbor Relation (ANR) function which resides in the eNB. For each neighbor cell, the NRT currently lists four fields, namely:

TCI—for E-UTRAN, it corresponds to the E-UTRAN Cell Global Identifier (ECGI) and Physical Cell Identifier (PCI);

No Remove—if checked, it forbids removal of the neighbor cell relation from the NRT;

No HO—if checked, it forbids handover to the neighbor cell;

No X2—if checked, it forbids using the X2 interface with the neighbor.

The ANR function adds, manages and removes neighbor information from the NRT using the information broadcast by each cell and reported by UE measurements [E-UTRA Radio Resource Control (RRC); Protocol Specification (Release 10); 3GPP TS 36.331 V10.2.0 (2011-06)]. O&M can also add and delete neighbor relations, as well as change the attributes. The NRT can also be modified by means of neighbor cell information received over an X2 interface (i.e. Neighbor Information Information Element, IE, in X2: X2 SETUP REQUEST, X2: X2 SETUP RESPONSE and X2: eNB CONFIGURATION UPDATE messages).

When the eNB requests a UE to measure neighboring cells, the UE reports back with a measured cell's PCI, ECGI, TAC and all detected PLMN IDs. If the detected cell is a closed or hybrid cell, the UE also reports its CSG ID. The eNB can differentiate between open-access HeNBs and other types of HeNBs, or eNBs, by the PCI or ECGI.

When a handover is necessary, once the source eNB has identified candidate target cells, the only decision it has to make relates to the handover type (X2 directly to the target, or S1 through the core network). If the candidate target cells include hybrid or closed cells, the handover must be performed through S1 so that the MME can check whether the UE is authorized to access the selected target cell. As discussed above, in Release-11 such scenarios will be introduced. Solutions to allow X2 handover at least between eNBs and hybrid HeNBs are required, but the current NRT does not provide enough information for this purpose. According to Release-10 behavior, if the UE detects a closed or a hybrid cell it reports its CSG ID but not its access mode, even though both are broadcast in SIB1, so the eNB must use some other means to learn about the access mode of its neighbors. If the eNB is configured with a PCI range used only for closed-access HeNB cells, this is one means to perform such a preliminary distinction.

If a UE measurement report includes a PCI within such range and a CSG ID, then the eNB knows that the reported cell is a closed-access cell. If the UE measurement report includes a PCI outside the closed-access PCI range and it includes a CSG ID, then the eNB can deduce that the reported cell is hybrid. However, if the UE measurement report includes a PCI outside the closed-access PCI range and it does not include a CSG ID, then the eNB will not be able to decide whether the neighbor cell is an open-access HeNB cell or a macro eNB cell. The latter is a very important piece of information, given that the unique identifier for a target (H)eNB is nested in the target CGI and it has a different length depending on whether the target is a HeNB or an eNB. Therefore, to distinguish between all possible cell access modes the operator would be required to partition the available PCI/address range among open-access, hybrid and closed HeNBs, leading to loss of flexibility and possible waste of PCIs/addresses.

It is proposed here to enhance the NRT by adding the following additional fields for each cell with which a neighbor relation is established:

Neighbor cell's CSG ID,

Neighbor cell's cell access mode

List of PCIs corresponding to neighbor cell's neighbor cells

By having this information available for each neighbor relation, a set of handover strategies can be enabled in the source eNB. Neighbor cells can thus be prioritized, de-prioritized or excluded from X2 handover candidates by comparing their CSG ID with the CSG ID received from the UE, even before the handover procedure is initiated.

Assuming that the PCI range is "split" for the different types of HeNBs, the source eNB can distinguish between different types of HeNB. In fact, this also enables the source eNB to distinguish between open HeNBs and macro eNBs, and therefore understand how to construct the HeNB ID. Furthermore, the UE reports the CSG ID of a closed or hybrid cell (but not its access mode, even though both are broadcast in SIB1). Therefore, under certain conditions, the eNB has access to both CSG ID and cell access mode of its neighbors, and can use this information when selecting a handover candidate for any outbound CSG UE.

In cases where the PCI split for different types of HeNBs is not available (e.g. the operator has not configured/partitioned the PCI space), this "CSG awareness" can also be beneficial for the source eNB when the identified neighbor is in its NRT but, for whatever reason, no X2 interface has yet been set up between the two. For example, in case of handover to open access cells, this solution may help resolve the problem of how to construct the HeNB ID. Namely, in cases of handovers to Open Access cells towards which no X2 interface is available and in cases where it is not possible to identify the target cell access mode from its PCI, the serving eNB needs to determine how to construct the eNB ID or HeNB ID from the CGI stored in the NRT and corresponding to the target PCI reported by the UE. If the NRT has been enhanced with the Cell Access Mode of the target cell, the source eNB would be able to look up the NRT and determine whether the PCI reported by the UE corresponds to an Open Access HeNB Cell (in which case HeNB ID consists of the 28 most significant bits of the CGI) or whether the PCI reported by the UE corresponds to an eNB Cell (in which case eNB ID consists of the 20 most significant bits of the CGI).

It may also be beneficial, for each entry in the NRT, to consider linking to other entries within the NRT (e.g. neighbors' neighbors as reported by the UE). Namely, the UE is able to report the PCIs visible in its neighborhood. It is beneficial for the serving eNB to store for each cell's PCI in the NRT the PCIs of its neighbor cells. Using this additional information would open up additional possibilities to resolve PCI conflicts among neighbors. This is because in cases where the UE reports a PCI that is not unique in the NRT of the serving eNB, there is the need to uniquely identify the cell that corresponds to that PCI. By monitoring the other PCIs reported by the UE at the time when the target cell's PCI is reported, the serving eNB is capable of looking up in the NRT and determine at which of the duplicated PCIs the UE is pointing. Therefore, the serving eNB is able to derive the CGI of the target cell.

The CSG "awareness" proposed here can be advantageous in allowing a source eNB to preliminarily "weeding out" or prioritise potential handover target candidates from a large number of neighbors. In some cases, existing information in the NRT could be used without the need to ask the UE for additional measurements after it has reported a neighbor's PCI.

By way of example, the source eNB may implement the following steps after an outgoing handover decision has been taken:
1. The source eNB reads its NRT;
2. If the UE has reported CSG membership, CGI and CSG ID of the neighbor cell, the eNB removes from potential targets all closed CSG neighbors with a CSG ID which is different from the UE's;
3. The source eNB prioritizes closed and hybrid neighbor cells with the same CSG ID as the UE's, over open ones with similar received signal level.
4. If the UE has not reported CSG membership in Step 2 above, the source eNB can of course remove all closed CSG neighbor cells from potential handover candidates.
5. The outgoing handover can now be performed.

The table shown in FIG. 2 shows a sample NRT held in an eNB taking into account the proposed enhancement. For each neighbor relation, the eNB keeps track of the reported CSG ID and cell access mode.

Figure 3:
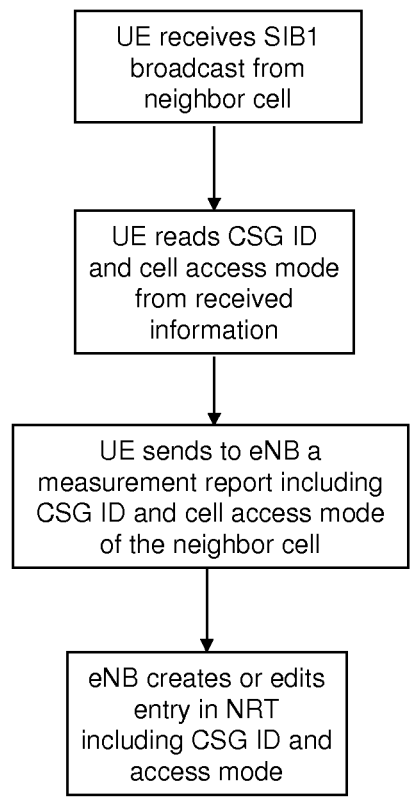
FIG. 3 is a flow diagram illustrating a process for reporting neighbor cell information from a UE to an eNB.

FIG. 3 is a flow diagram illustrating a first embodiment of the enhancement, according to which the CSG ID and cell access mode of a neighbor cell are obtained immediately after the eNB has received the UE report containing the measurement. More particularly, the UE sends to the eNB a report including the CSG ID and cell access mode of the neighbor cell as measured from SIB1. The eNB adds the CSG ID and cell access mode, together with all the other information for the newly measured neighbor, in the corresponding entry in the NRT.

Figure 4:
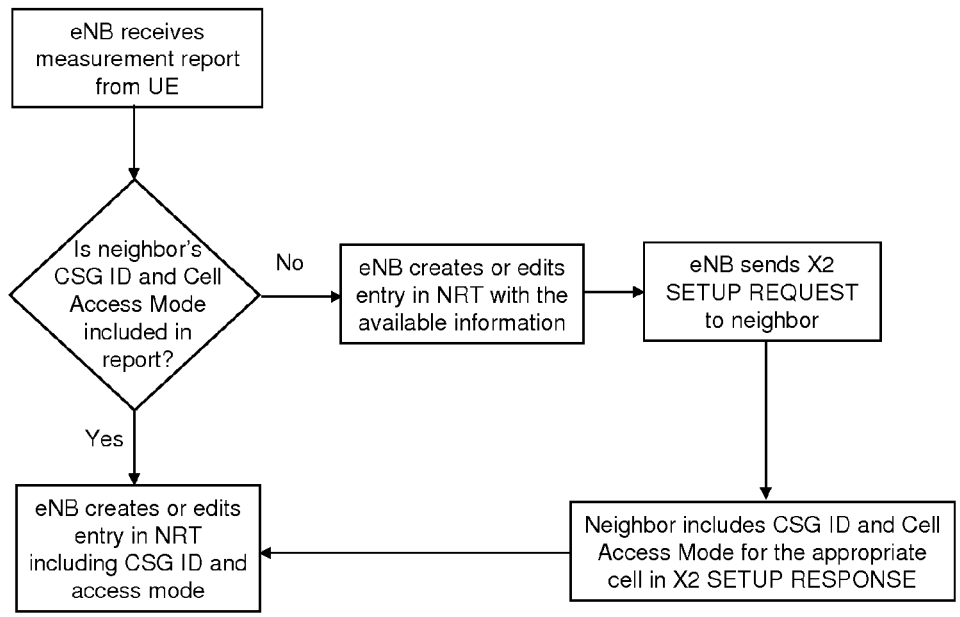
FIG. 4 is a flow diagram illustrating a process carried out at an eNB to maintain a NRT.

FIG. 4 is a flow diagram illustrating a second embodiment of the enhancement, according to which the CSG ID of the neighbor cell is not available in the measurement report sent from the UE. The UE sends a report with all of the measured parameters of the neighbor cell, but without its CSG ID. The eNB then adds the neighbor cell to its NRT with the available information. The eNB tries to establish an X2 interface to this newly added neighbor node by initiating the X2 Setup procedure. If the neighbor serves one or more CSG cells, it reports them to the other eNB within the Served Cell Information IE in the X2 SETUP RESPONSE message, including the CSG ID and Cell Access Mode of each cell as appropriate. The eNB modifies the corresponding entries for this neighbor in the NRT, adding the CSG ID and Cell Access Mode of each cell as appropriate.

Figure 5:
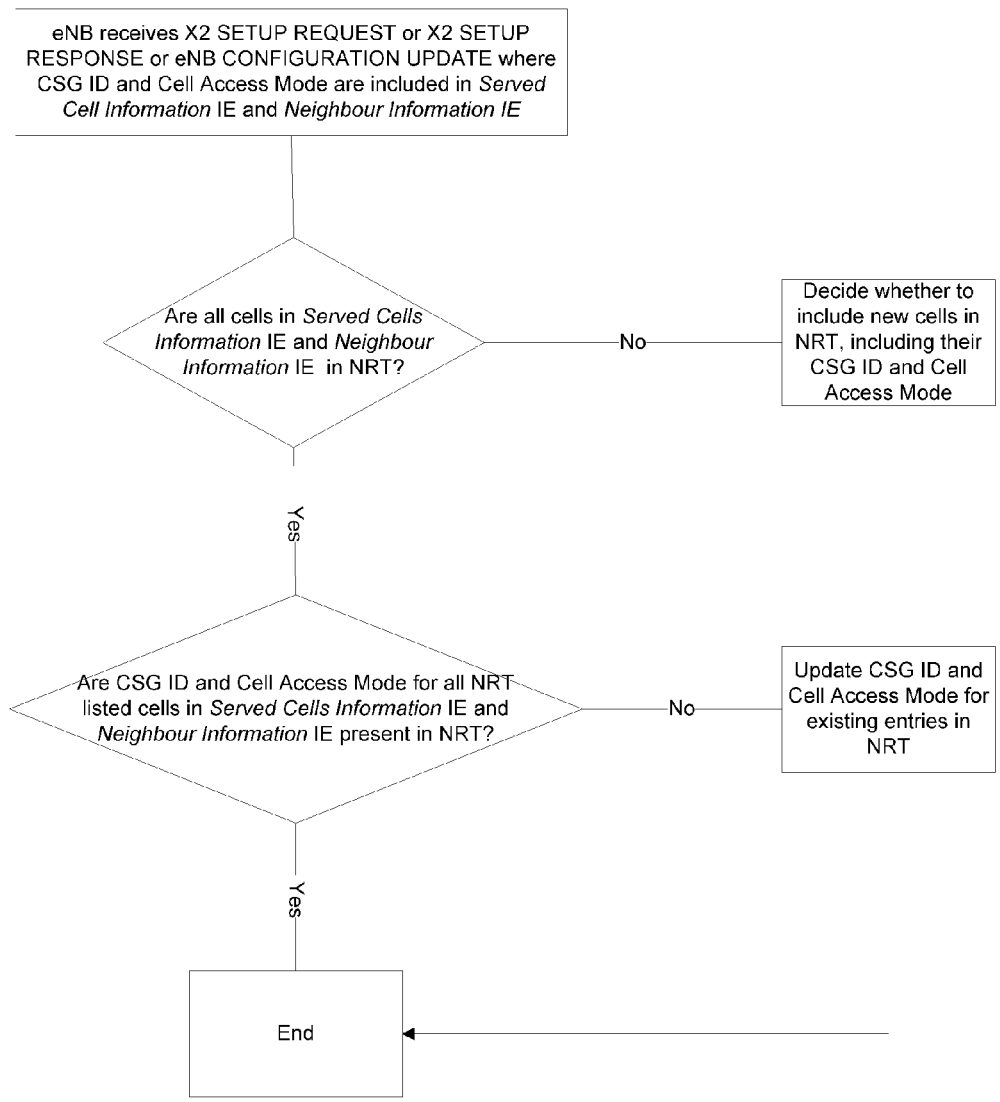
FIG. 5 is a flow diagram illustrates a process for maintaining an extended NRT via an X2 interface.

FIG. 5 is a flow diagram illustrating a third embodiment of the enhancement, according to which the CSG ID and cell access mode of the neighbor are exchanged purely via X2 signaling, i.e. without involving UE measurement reports. The eNB receives the Served Cells Information IE and Neighbor Information IE from a neighbor eNB via one of the following messages:
X2: X2 SETUP REQUESTETUP REQUEST
X2: X2 SETUP RESPONSE
X2: eNB CONFIGURATION UPDATE For each cell reported in the Served Cells Information IE and Neighbor Information IE, the CSG ID and Cell Access mode may be reported (see FIGS. 6-9 for IEs and message structures)

The eNB receiving the Served Cells Information IE and Neighbor Information IE checks if any of the reported cells is not included in its NRT and decides whether to update its NRT with such new cells, including their CSG ID and Cell Access Mode The eNB checks whether the cells that are in its NRT and that are reported via the Served Cells Information IE and Neighbor Information IE, have CSG ID and Cell Access Mode entries in the NRT. If not, the eNB updates CSG ID and Cell Access Mode in the NRT via the information received in Served Cells Information IE and Neighbor Information IE In a fourth embodiment of the enhancement (not illustrated in the Figures), the CSG ID and cell access mode of the neighbor cell is configured externally into the NRT via O&M.

In a fifth embodiment of the enhancement the serving eNB does not have an X2 connection with the target cell and needs to determine the eNB ID or HeNB ID of the target base station. By means of looking up the enhanced NRT table the serving eNB can understand the cell access mode of the target cell. If the cell access mode is hybrid or open the target cell belongs to a HeNB, hence the HeNB ID will be derived for inclusion in handover messages. Alternatively, if no access mode is available for the target cell the target cell belongs to an eNB and the eNB ID will be derived for inclusion in handover messages.

In a sixth embodiment the enhanced NRT helps resolving situations in which the PCI reported by the UE is not unique in the NRT, i.e. there are PCI collisions in the NRT. In this case the serving eNB monitors the other PCIs reported by the UE and compares them with the list of neighbor cells' PCIs present in the NRT for each colliding PCI entry. If the PCIs reported by the UE overlap some or all of the neighbor cell's PCIs of one of the colliding PCI, then that PCI corresponds to the right target cell.

Figure 6:
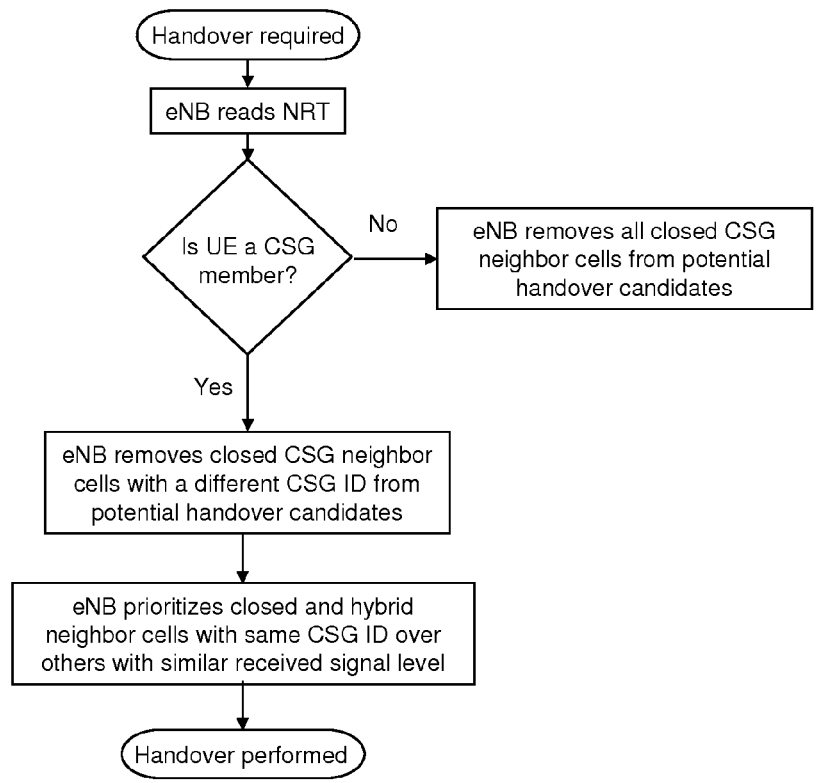
FIG. 6 is a flow diagram illustrating a handover process for a UE making use of an extended NRT.

FIG. 6 is a flow diagram illustrating the CSG-aware handover procedure.

In all embodiments with the exception of embodiment five, the CSG ID and access mode of the neighbor cells enable the eNB to perform "CSG-aware" X2 handover strategies without the need for preliminary access control by the core network. Such "CSG-aware" X2 handover strategies include, but are not limited to:

Excluding from potential handover candidates, all closed-access CSG neighbors whose CSG IDs do not match that reported by the UE (thereby avoiding a handover failure);

Prioritizing as potential handover candidates all closed or hybrid cells with the same CSG ID as reported by the UE, with respect to other cells having similar received signal level (thereby providing better service priority to the UE);

Excluding all closed-access CSG neighbors from potential handover candidates for a non-CSG UE (thereby avoiding a handover failure);

Enabling correct encoding of the eNB ID or HeNB ID for handovers to closed/hybrid/open access HeNBs cells (28-bit-long HeNB ID) or to macro eNB cells (20-bit-long eNB ID); and Enabling selection of X2 handovers for, e.g. hybrid/open access targets, while performing S1 handovers for closed access targets (for which a stricter access control by CN is needed).

In embodiment five the solution allows for construction of HeNB ID/eNB ID in the case of no X2 interface between source and target.

A final embodiment of the proposed enhancement aims to support the handover procedures enabled by previous embodiments with CSG ID validation at the target cell in case of X2 handover. More particularly, this embodiment involves adding in the X2: HANDOVER REQUEST message, the CSG ID reported by the UE in the measurement report. Once the target cell receives the X2: HANDOVER REQUEST message including the CSG ID IE, it will check that the reported CSG ID matches the one broadcast by the target cell over the air. If the reported CSG ID and the broadcast CSG ID do not match, and if the target cell is a closed access cell, then the target eNB shall fail the handover. If the target cell is hybrid or open, the target eNB may decide whether to fail or to successfully complete the handover procedure.

The proposals considered here make use of a knowledge of the CSG ID and access mode of the neighbors, enabling better integration of the femto layer with the macro layer in those scenarios where high mobility and dense traffic are foreseen, and is an important complement for HetNet deployments. They enables fast X2 handovers for CSG UEs from any macro to any of its femto neighbors through "CSG-aware" X2 handovers by pre-empting the neighbor choice according to its CSG. This reduces the chance of the handover failure due to failed access control. In practice, a "CSG-aware" X2 handover procedure should always be successful precisely because it will be initiated toward a "good" neighbor (i.e. one with an appropriate CSG for the UE).

It will be appreciated by the person of skill in the art that various modifications may be made to the above described embodiments without departing from the scope of the present invention.

The following items are either referenced in the above text or otherwise provide relevant background to the implementation of the proposals described.

[1] RAN3 #73 Chairman's Notes.
[2] R3-112312 "Text Proposal for Use Cases for UMTS and LTE", Alcatel-Lucent.
[3] R3-112052 "Rel-11 HeNB Enhanced Mobility Scenarios", Ericsson.
[4] "E-UTRA and E-UTRAN Overall Description; Stage 2 (Release 10)"; TS 36.300 V10.4.0.
[5] "E-UTRAN; X2 Application Protocol (X2AP) (Release 10)"; TS 36.423 V10.2.0.
[6] "E-UTRAN; S1 Application Protocol (S1AP) (Release 10)"; TS 36.413 V10.2.0.
[7] "UMTS and LTE; Mobility Enhancements for H(e)NB (Release 11)"; TR 37.803 V0.1.2.
[8] R373b.09 "CSG Checking at the MME Through Path Switch", Ericsson.
[9] "E-UTRA Radio Resource Control (RRC); Protocol Specification (Release 10)"; TS 36.331 V10.2.0.
[10] R3-102875 "Addressing of HeNBs", Ericsson.

The invention claimed is:

1. A method of initiating handover of a User Equipment (UE) via an X2 interface in a cellular network comprising a plurality of enhanced Node Bs (eNBs), the method comprising:

receiving at a source eNB, from the UE, a handover measurement report containing a Physical Cell Identifier (PCI) of a cell of a neighboring eNB;

at the source eNB, performing a lookup of a Neighbor Relation Relation Table to identify a cell global identity (CGI) and access mode associated with the PCI; and using the identified CGI and the access mode to construct an eNB (eNB ID) for said neighboring eNB.

2. The method according to claim 1, wherein
the CGI comprises a 28 bit cell identity (CI);
if said access mode identifies the neighboring eNB as a Home eNB, said eNB identity is constructed using the entire 28 bit CI of the CGI, and if the access mode identifies the neighboring eNB as a macro eNB, said eNB identity is constructed using the first 20 bits of the CI.

3. The method according to claim 2, further comprising maintaining within said Neighbor Relation Table, for each neighboring cell, PCIs of one or more cells neighboring that neighboring cell.

4. The method according to claim 1, further comprising maintaining within said Neighbor Relation Table, for each neighboring cell, PCIs of one or more cells neighboring that neighboring cell.

5. The method of claim 1, wherein
the CGI comprises a 28 bit cell identity (CI); and
constructing the eNB ID using the CGI and access mode comprises: 1) determining whether the access mode indicates that the PCI reported by the UE corresponds to an eNB cell; and (2) in response to determining that the access mode indicates that the PCI reported by the UE corresponds to an eNB cell, the eNB ID is constructed using only 20 bits of the CI.

6. The method of claim 1, wherein
the CGI comprises a 28 bit cell identity (CI); and
constructing the eNB ID using the CGI and access mode comprises: 1) determining whether the access mode indicates that the PCI reported by the UE corresponds to an open access HeNB cell; and (2) in response to determining that the access mode indicates that the PCI reported by the UE corresponds to an open access HeNB cell, the eNB ID is constructed using the entire 28 bits of the CI.

7. A method of initiating handover of a User Equipment (UE) in a cellular network comprising a plurality of enhanced Node Bs (eNBs), the method comprising:
receiving at a source eNB, from the UE, a handover measurement report containing a Physical Cell Identifier (PCI) of a cell of a neighboring eNB;
at the source eNB, performing a lookup of a Neighbor Relation Table to identify a plurality of cell global identities (CGIs) associated with the PCI, the neighbor relation table also containing, for each such CGI, PCIs of neighboring cells; and
selecting the correct CGI from said plurality of CGIs by comparing the PCIs of further neighboring eNBs cells reported by the UE with the neighboring PCIs of each of said plurality of CGIs; and
deriving from the selected correct CGI, an eNB identity of said neighboring eNB.

8. A method of initiating handover of a User Equipment (UE) from a cell of a source enhanced Node B (eNB) to a cell of a target eNB via the X2 interface, the method comprising:
at the source eNB, maintaining a Neighbor Relation Table (NRT) comprising a plurality of target cell identifiers (TCIs), including a first TCI for identifying a first target cell and an second TCI for identifying a second target cell, wherein the NRT further comprises a first access mode identifier associated with the first TCI and a second access mode identifier associated with the second TCI, wherein the first access mode identifier indicates that the first target cell is one of an open cell, a closed cell, and a hybrid cell, and the second access mode identifier indicates that the second target cell is one of an open cell, a closed cell, and a hybrid cell;
determining that a handover of the UE is required;
using the information stored in the NRT to identify any closed and hybrid target cells to which UE has access;
forming a set of candidate target cells, said set of target cells including all closed target cells and hybrid targets cells to which the UE has access, if any
selecting a target cell from the set of candidate target cells; and
performing handover of the subscriber from the source to the selected target cell including establishing an X2 interface between the source eNB and a target eNB serving the selected target cell.

9. The method according to claim 8, wherein said step of determining that a handover of the UE is required comprises receiving at the source eNB, from said UE, reports of neighboring eNB cells including, where available, the CSG identity and access mode of a neighboring eNB cell.

10. The method according to claim 9, further comprising maintaining within said Neighbor Relation Table, for each neighboring cell, PCIs of one or more cells neighboring that neighboring cell.

11. The method according to claim 8, further comprising maintaining within said Neighbor Relation Table, for each neighboring cell, PCIs of one or more cells neighboring that neighboring cell.

* * * * *